United States Patent [19]

Ohling

[11] Patent Number: 4,736,592
[45] Date of Patent: Apr. 12, 1988

[54] APPARATUS AND METHOD FOR COOLING PRODUCE AND THE LIKE

[75] Inventor: Robert S. Ohling, Watsonville, Calif.

[73] Assignee: American Industrial Refrigeration, Inc., Watsonville, Calif.

[21] Appl. No.: 944,080

[22] Filed: Dec. 22, 1986

[51] Int. Cl.[4] .............................................. F25D 25/00
[52] U.S. Cl. ........................................ 62/62; 62/187; 62/237
[58] Field of Search ............... 62/62, 63, 65, 237, 62/239, 380, 186, 187

[56] References Cited

U.S. PATENT DOCUMENTS

| | | | |
|---|---|---|---|
| 3,688,518 | 9/1972 | Goltos | 62/380 |
| 4,164,129 | 8/1979 | Stueber | 62/380 |
| 4,339,928 | 7/1982 | Guibert | 62/62 |
| 4,380,908 | 4/1983 | Crabb, Jr. | 62/237 |
| 4,474,020 | 10/1984 | Freeman | 62/237 |
| 4,532,774 | 8/1985 | Burns | 62/239 |

Primary Examiner—Ronald C. Capossela
Attorney, Agent, or Firm—Townsend and Townsend

[57] ABSTRACT

Apparatus and the method for directing cool air to stacks of containers holding freshly harvested produce and the like, to remove field heat therefrom. Air is caused to flow in one direction through the containers to cool the produce, then the airflow direction is reversed and the air is caused to flow in the opposite direction. In this way, the produce in the container is uinformly cooled. The apparatus includes a housing having a suction fan for blowing air through an air cooler into a plenum from which the cool air passes through the containers. The direction of airflow is selected by moving damper devices relative to the housing.

17 Claims, 4 Drawing Sheets

APPARATUS AND METHOD FOR COOLING PRODUCE AND THE LIKE

This invention relates to improvements in the cooling of freshly harvested produce and, more particularly, to an apparatus and method for uniformly cooling such produce with cooled air.

BACKGROUND OF THE INVENTION

The present state of suction cooling of freshly harvested produce is well known. Typical of the techniques of this type are disclosed in U.S. Pat. No. 4,532,774 and in a publication entitled "Commercial Cooling of Fruits and Vegetables" by Mitchell, Gauillou and Parsons, Manual 43, California Agricultural Experiments Station, Extension Service, available through *Agricultural Publications,* University of California, Berkeley, CA 94720 (December 1972). In both of these disclosures, a single airflow is caused to flow through stacks of containers of freshly harvested produce in one direction into a central space between two rows of container stacks. A suction fan draws air through the containers and into the central space, then through the fan, then through an air cooler and back through the containers to the central space in a circulatory manner.

While the cooling technique disclosed in these publications has been satisfactory, such technique does not assure uniformity in cooling of the produce at the upsteam sides of the containers is cooled to a greater degree such as by a minimum of 2° F. due to air warming as the air passes through the containers and in contact with the produce. Since cooling is not uniform with use of this technique, a need exists for an improved technique so as to reduce cooling time and to result in a more uniform temperature of the produce. The present invention satisfies this need.

SUMMARY OF THE INVENTION

The present invention is directed to an apparatus and method for cooling freshly harvested produce and the like means is provided to cause a flow of cooled air in one direction through the containers holding the produce; then, the airflow is reversed and the air flows in the opposite direction through the containers. In this way, the air will have a wider temperature approach difference, resulting in faster cooling and more uniform produce temperatures.

As used herein, the term "produce" means fruits, vegetables and other food products which can be cooled by heat exchange with a cooled airflow.

The primary object of the present invention is to provide an improved apparatus and method for cooling of produce wherein the produce is arranged in stacks of containers and cool air is caused to flow past the produce first in one direction, then in the opposite direction so that the produce in the containers will be uniformly cooled and the cooling time is significantly reduced over that achieved with prior art methods.

Other objects of the present invention will become apparent as the following specification progresses, preference being had to the accompanying drawings for an illustration of the apparatus of invention.

IN THE DRAWINGS

Figure 1:
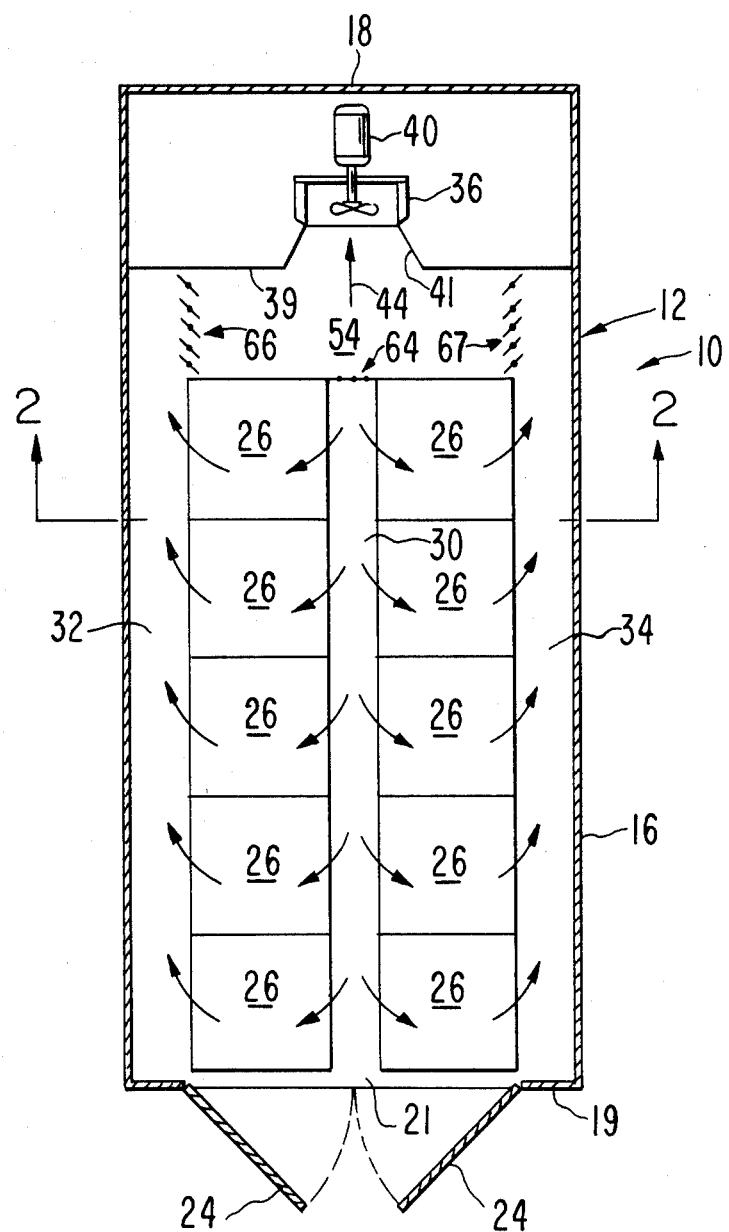
FIG. 1 is a schematic, top plan view of a cooling system for freshly harvested produce and the like, showing the system in condition for cooling two rows of stacked containers holding the produce to be cooled.

The cooling system for freshly harvested produce which is the subject of the present invention is broadly denoted by the numeral 10 and includes a housing 12 having a pair of spaced sidewalls 14 and 16, a pair of end walls 18 and 19, a bottom wall 20 (FIG. 2), a top wall 22 and a pair of swinging doors 24 (FIG. 1) coupled to end wall 19 to close an end opening 21 in the housing. Doors 24 can swing out as shown in FIG. 1 so that a plurality of stacks 26 of container 27 can be moved by pallets into the housing and supported on bottom wall 20. The container stacks 26 form two spaced rows as shown in FIG. 1.

Each container stack 26 may comprise a plurality of containers 27 of freshly harvested produce, such as strawberries, which are to be cooled by system 10 to eliminate field heat quickly therefrom. The containers 27 (FIG. 3) have openings 29 therein to allow air to pass laterally through the containers and into heat exchange relationship to the produce carried in the containers. Adjacent container stacks 26 abut each other, and doors 24 abut the end container stacks 26 so that air in the space 30 (FIG. 1) between the two rows of container stacks 26 must pass laterally through the container openings 29 (FIG. 3) when the air pressure in side spaces 32 and 34 is lower than the air pressure in space 30. Conversely, air must flow laterally from spaces 32 and 34 to space 30 when the air pressure in space 30 is below the air pressure in spaces 32 and 34.

System 10 has means for creating a flow of cooled air by suction between space 30 and spaces 32 and 34. This flow can be in either direction. The cooled air operates to cool the produce in the containers 27 to remove field heat therefrom.

The airflow means includes an exhaust fan 36 provided near end wall 18 and adjacent to a vertical panel 39 which separates a region 38 from a region 54. Panel 39 has an air inlet opening 41 aligned with fan 36, the latter having a motor 40 near an air cooler 42. The normal airflow into the fan 36 and air cooler is indicated by arrows 44, 46 and 48, the cooled air passing out of cooler 42 and into an overhead plenum 50 which is isolated from spaces 30, 32 and 34 by a horizontal panel 52.

Figure 2:
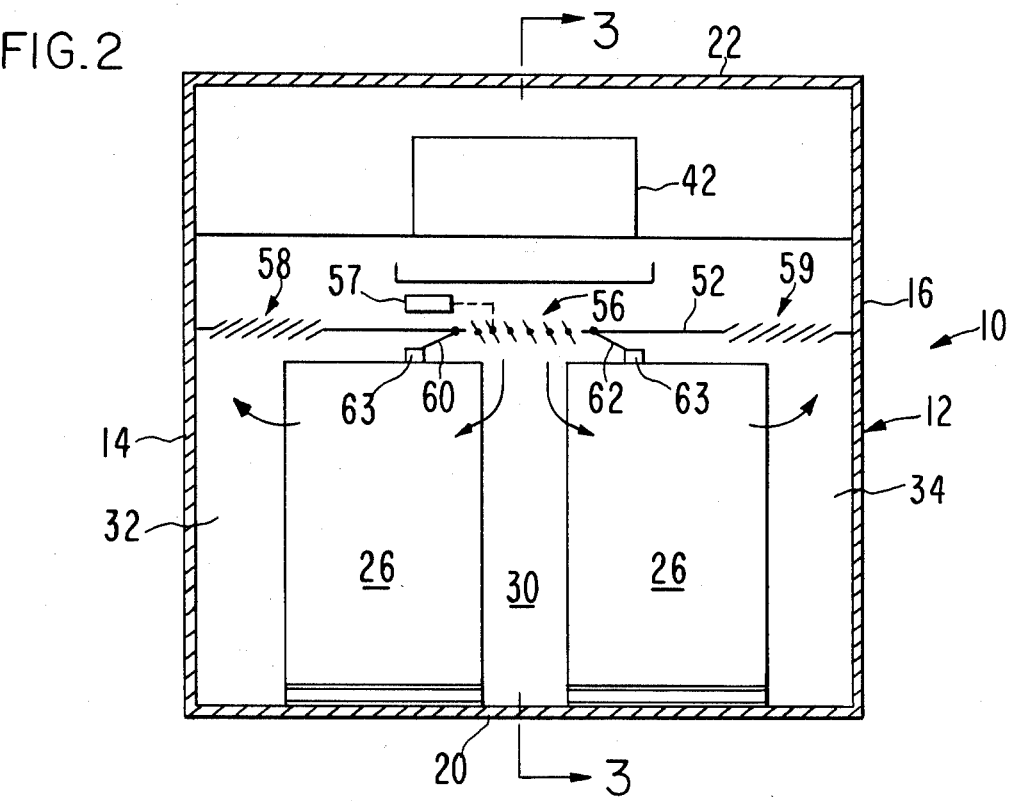
FIG. 2 is a vertical section taken along line 2—2 of FIG. 1.

Panel 52 has a first set of damper plates 56 (FIGS. 2 and 3) and these damper plates are rotatable about horizontal axes so as to open and close central space 30 to fluid communication with the overhead plenum 50 containing cooled air. Any suitable means 57 (FIG. 2) can be used for opening and closing the damper plates 56, such as a timer motor, a stepper motor and the like, which can be manually or automatically, i.e., thermostatically, controlled. As shown in FIG. 2, the axes of damper plates 56 are generally parallel with the planes of sidewalls 14 and 16.

A pair of second sets of damper plates 58 and 59 are provided for panel 52 near respective sidewalls 14 and 16. These damper plates 58 and 59 have axes parallel to the axes of damper plates 56 and are opened and closed so as to provide or block fluid communication between spaces 32 and 34 and overhead plenum 50. Means, such as means 57, is provided to pivot damper plates 58 and 59 into their open and closed positions.

A pair of closure plates 60 and 62 are pivotally mounted on panel 52 on opposite sides of damper plates 56 as shown in FIG. 2. These closure plates 60 and 62 are manually or automatically controlled for movement into the operative positions thereof shown in FIG. 2 in which the lower margins of plates 60 and 62 engage pads 63 on the upper ends of container stacks 26 after stacks 26 have been moved into housing 12. In this manner, panel 52 is allowed to be spaced slightly above the container stacks 26, yet space 30 is kept out of fluid communication with spaces 32 and 34 as shown in FIG. 2. When system 10 is in operation, damper plates 56, 58 and 59 operate such that, when damper plates 56 are open, damper plates 58 and 59 are closed and, when damper plates 56 are closed, damper plates 58 and 59 are open.

The end of space 30 can be open and closed to region 54 (FIG. 1) by a third set of damper plates 64 which are pivotal about generally vertical axes. The damper plates 64 extend from panel 52 to bottom wall 20 housing 12.

Fourth sets of damper plates 66 and 67 are provided near the outer sides of region 54 in alignment with the outer side faces of container stacks 26 as shown in FIG. 1. Damper plates 66 and 67 are pivotal about generally vertical axes, and damper plates 66 and 67 operate to open and close region 54 to spaces 32 and 34. System 10 operates such that, when damper plates 64 are open, damper plates 66 and 67 are closed, and conversely, when damper plates 64 are closed, damper plates 66 and 67 are open. Means, such as means 57, is provided to pivot damper plates 64, 66 and 67 into their open and closed positions.

In operation, system 10 is assembled so that fan 36 is near end wall 18 and damper plate 56, 58, 59, 64, 66 and 67 are arranged as shown in FIGS. 1 and 2.

Freshly harvested produce, such as strawberries or the like, are placed in containers 27 and the containers are placed on pallets. The pallets are moved into housing 12 when doors 24 are opened. The container stacks are placed in two rows of about five stacks in each row. It is possible to have additional housings 12 adjacent to housing 12 as shown in FIG. 1 with each housing being identical in the interior thereof and adapted for receiving two rows of pallet stacks.

Once the container stacks 26 are properly placed in the housing 12, they form spaces 30, 32 and 34 and the system is ready for cooling the produce in the container stacks after doors 24 have been closed. When closed, the doors abut the end faces of the adjacent pallet stacks so there is substantially no leakage of air past such end faces of the pallet stacks.

Figure 3:
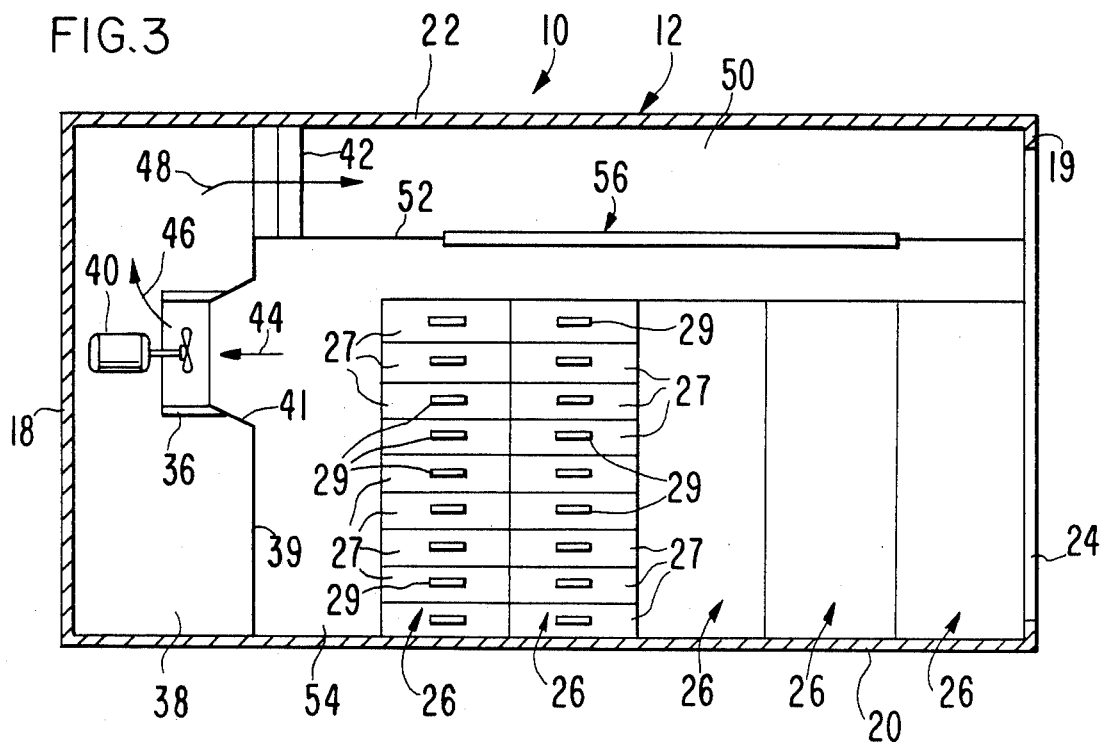
FIG. 3 is a vertical section taken along line 3—3 of FIG. 2.

With damper plates 66 and 67 open and damper plates 64 closed and with damper plates 56 open and damper plates 58 and 59 closed, suction fan 36 is actuated to cause a flow of air into the suction side of the fan, then into region 38 and through cooler 42 by way of the airflow path defined by arrows 44, 46 and 48 (FIG. 3). The air is cooled and driven into plenum 50 (FIG. 3).

Since the air is under pressure, the air is driven from plenum 50 into and through damper plates 56 and into space 30. Since closure plates 60 prevent the air from flowing over the pallet stacks and into spaces 32 and 34, the air must flow into space 30, then through the containers 27 for the produce, then into the heat exchange relationship to the produce, and then out of the containers 27 and into spaces 32 and 34. The air continues to flow from spaces 32 and 34 toward the suction side of the fan 36 and then past open damper plates 66 and 67 and into region 54 and into the suction side of the fan 36.

This airflow circulates for a certain period of time as determined by the cooling characteristics of the produce as well as the amount of cooling provided by cooler 42. During this airflow movement, the produce near the upstream sides of the containers 27 gets a greater amount of cooling than the produce near the downstream sides of the containers.

To provide for uniform cooling of the produce, the flow of cool air through the containers is reversed so that the air will flow inwardly to space 30 from spaces 32 and 34 so that the produce which was initially downstream now becomes the upstream produce which gets a greater degree of cooling then it ordinarily would if it continued to be the downstream produce. Similarly, the produce that was initially upstream of the airflow is now the downstream produce which does not need much cooling by the reversed airflow.

Figure 4:
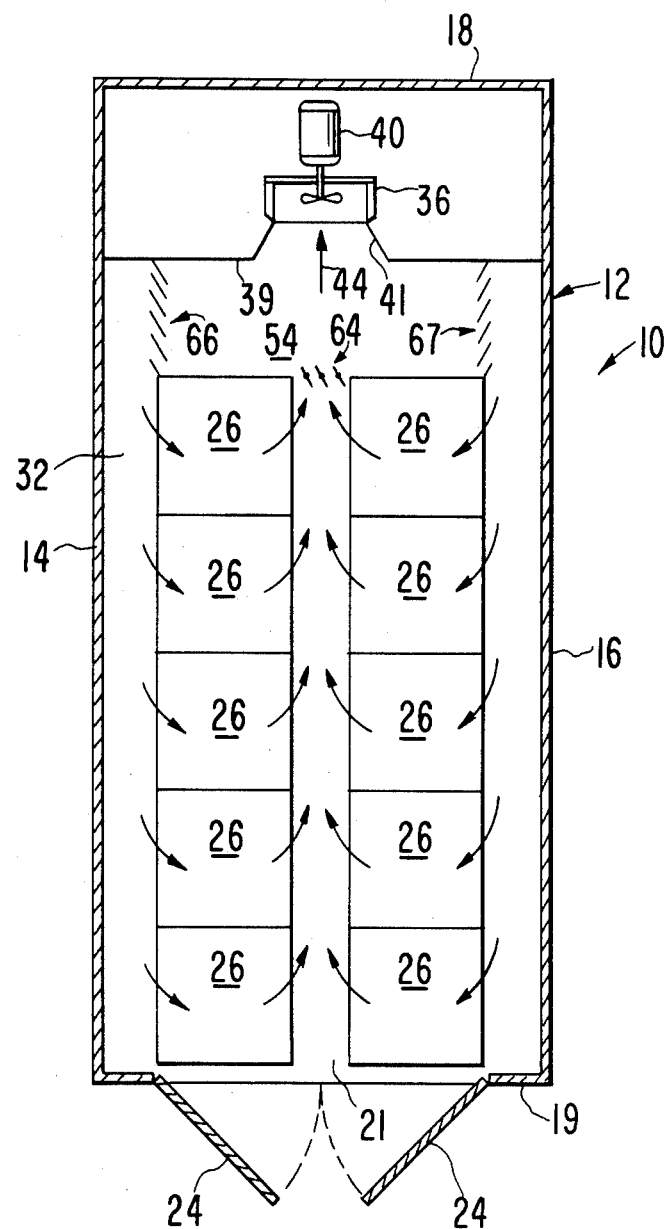
FIG. 4 is a view similar to FIG. 1 but showing the airflow through the produce in a reverse direction.
Figure 5:
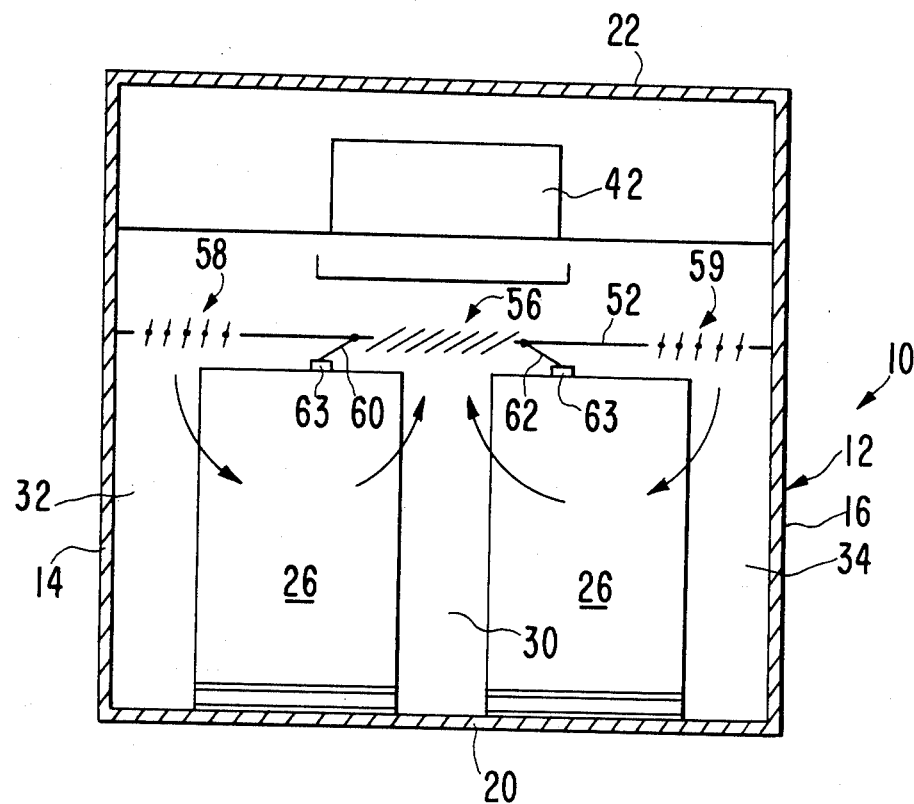
FIG. 5 is a view similar to FIG. 2 but showing the reverse airflow in accordance with FIG. 4.

To achieve the reversing of the flow, damper plates 56 are closed and damper plates 58 and 59 are opened. Thus, cool air from plenum 50 flows downwardly through damper plates 58 and 59 and into spaces 32 and 34 for flow through the produce containers and into space 30. During this time, damper plates 64 are open and damper plates 66 and 67 are closed. Thus, the air flowing into space 30 can only exit therefrom past damper plates 64 and into region 54 to the suction side of the fan 36. Thus, a reverse flow of air is caused to flow through containers 27 of stacks 26 from the outer sides of the container stacks 26 instead of from the inner sides as initially described above. In this manner, the produce in the containers is cooled by airflow in one direction and then cooled by airflow in the opposite direction so as to be uniformally cooled. The condition of system 10 for the reversed flow is shown in FIGS. 4 and 5.

The practice of the method of the present invention reduces cooling time and results in a more uniform temperature in produce container stacks. During normal suction cooling, the side of the container stacks where the air enters will be cooler then the outlet side by a minimum of 2° F. due to air warming passing therethrough. The present method therefor involves an automatic system for reversing stack airflow during the cooling cycles so that the air will now have a wider temperature approach difference, resulting in faster cooling and more uniform stack temperatures.

The cooling sequence of system 10 can and typically will be controlled by either a timing device or a temperature sensing element. After cooling has progressed through a predetermined cooling period based upon product, inlet temperature and any other determining factor peculiar to a particular product, the fan 36 will shut down for an interval long enough for the damper plates to be switched in positions without having to overcome air pressure difference during operation. Airflow through the pallet stacks will then reverse and the uniform cooling is quickly and easily achieved.

The cooling of produce in accordance with the present invention operates in the same manner no matter which direction the airflow is through the containers. The damper plates 60 and 62 which close off the communication between spaces 30, 32 and 34 may be either hinged to drop by gravity or be actuated by either air, hydraulic power or electrical actuators. If the sequence of cooling is controlled by timing devices, they may be simple clock timers, solid state timers or more sophisticated programmable controls or computer signals. If temperature sensing devices are used, they may sense product temperature, coil temperature, air temperature, etc.

Various techniques of loading the container stacks 26 can be used, such as roller conveyors, belt conveyors or fork lifts. It is also possible to provide dummy pallets or other air blocking devices for situations in which housing 12 is partially filled with container stacks 26.

I claim:

1. A method of cooling produce comprising: placing containers of the produce into two spaced rows of a confined region so that there is a space between the rows and an outer space between each row and an adjacent boundary of the region; directing a flow of cooled air from the central space to the outer spaces with the airflow being in heat exchange relationship to the produce in the containers; and causing a flow of cooled air from the outer spaces to the central space with the airflow being in heat exchange relationship to the produce in the containers.

2. A method as set forth in claim 1, wherein said directing and causing steps are performed for respective time intervals.

3. A method as set forth in claim 1, wherein said directing step includes generating the airflow in a plenum, blocking the airflow from the plenum to the outer spaces while permitting the airflow from the plenum to the central space, said causing step include blocking the flow of air from the plenum to the central space while permitting the flow of air from the plenum to the outer spaces.

4. A method as set forth in claim 1, wherein the airflow is caused by suction.

5. A method as set forth in claim 1, wherein each of said directing and causing steps includes circulating the airflow in said confined region, and including the step of cooling the airflow as it circulates in said region.

6. A method of cooling produce comprising: placing containers of the produce into a confined region; directing a flow of cooled air in one direction with the airflow being in heat exchange relationship to the produce in the containers; and thereafter causing a flow of cooled air in the opposite direction with the airflow being in heat exchange relationship to the produce in the containers.

7. A method as set forth in claim 6, wherein said directing and causing steps are performed for respective time intervals.

8. A method as set forth in claim 6, wherein the airflow is caused by suction.

9. A method as set forth in claim 6, wherein each of said directing and causing steps includes circulating the airflow in said confined region, and including the step of cooling the airflow as it circulates in said region.

10. Apparatus for cooling produce comprising: a housing having an access opening to allow containers of produce to be placed therein in two rows with the rows being spaced from each other to form a central space and with the rows being spaced from the inner surface of the housing to form two outer spaces, the containers having openings therethrough to permit an airflow in heat exchange relationship to the produce in the containers; means for creating an airflow through said housing; and damper means movable from a first position in which the airflow is directed from the central space to the outer spaces in heat exchange relationship to the produce in the containers to a second position in which the airflow is caused to flow from the outer spaces to the central space in heat exchange relationship to the produce, whereby the produce is cooled by the airflow in reverse directions.

11. Apparatus as set forth in claim 10, wherein is included means in the housing across the path of the airflow for cooling the airflow.

12. Apparatus as set forth in claim 10, wherein said airflow creating means includes a suction fan.

13. Apparatus as set forth in claim 10, wherein is included means communicating with said spaces for forming a plenum in the housing, said damper means including first and second damper devices shiftably coupled with the housing, said first damper devices being open to place the plenum in fluid communication with the central space when the second damper devices are closed to block fluid communication between the outer spaces and the plenum, said first damper devices being closed when the second damper devices are open.

14. Apparatus as set forth in claim 13, wherein the airflow creating means has a suction side, said damper means further includes third and fourth damper devices shiftably coupled with the housing, said third damper devices being open to place the outer spaces in fluid communication with said suction side of the airflow creating means when the fourth damper devices are closed, said third damper devices being closed when the fourth damper devices are open.

15. Apparatus for cooling produce comprising: a housing having an access opening to allow containers of produce to be placed therein with the containers having openings therethrough to permit an airflow therethrough in heat exchange relationship to the produce in the containers; means for creating an airflow through said housing; and damper means movable from a first position in which the airflow is moved in one direction through the containers in heat exchange relationship to the produce to a second position in which the airflow is moved in the opposite direction through the containers in heat exchange relationship to the produce, whereby the produce is cooled by the flow of air in reverse directions.

16. Apparatus as set forth in claim 15, wherein is included means in the housing across the path of the airflow for cooling the air.

17. Apparatus as set forth in claim 15, wherein said airflow creating means includes a suction fan.

* * * * *